Aug. 21, 1928.
C. GORE
1,681,664
VEHICLE SPEED CONTROL
Filed Oct. 18, 1922    2 Sheets-Sheet 1
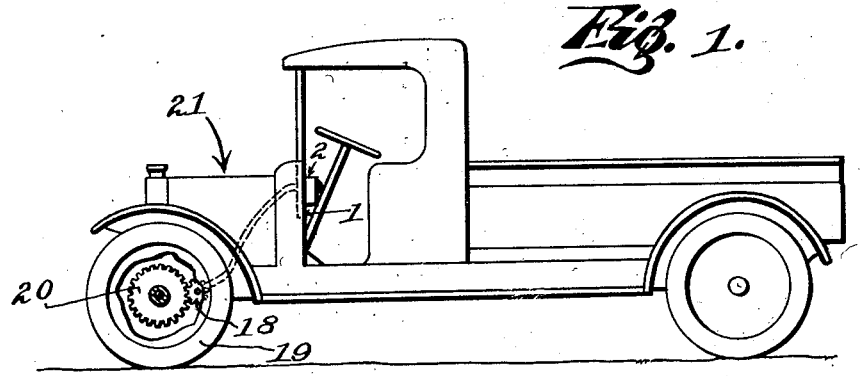
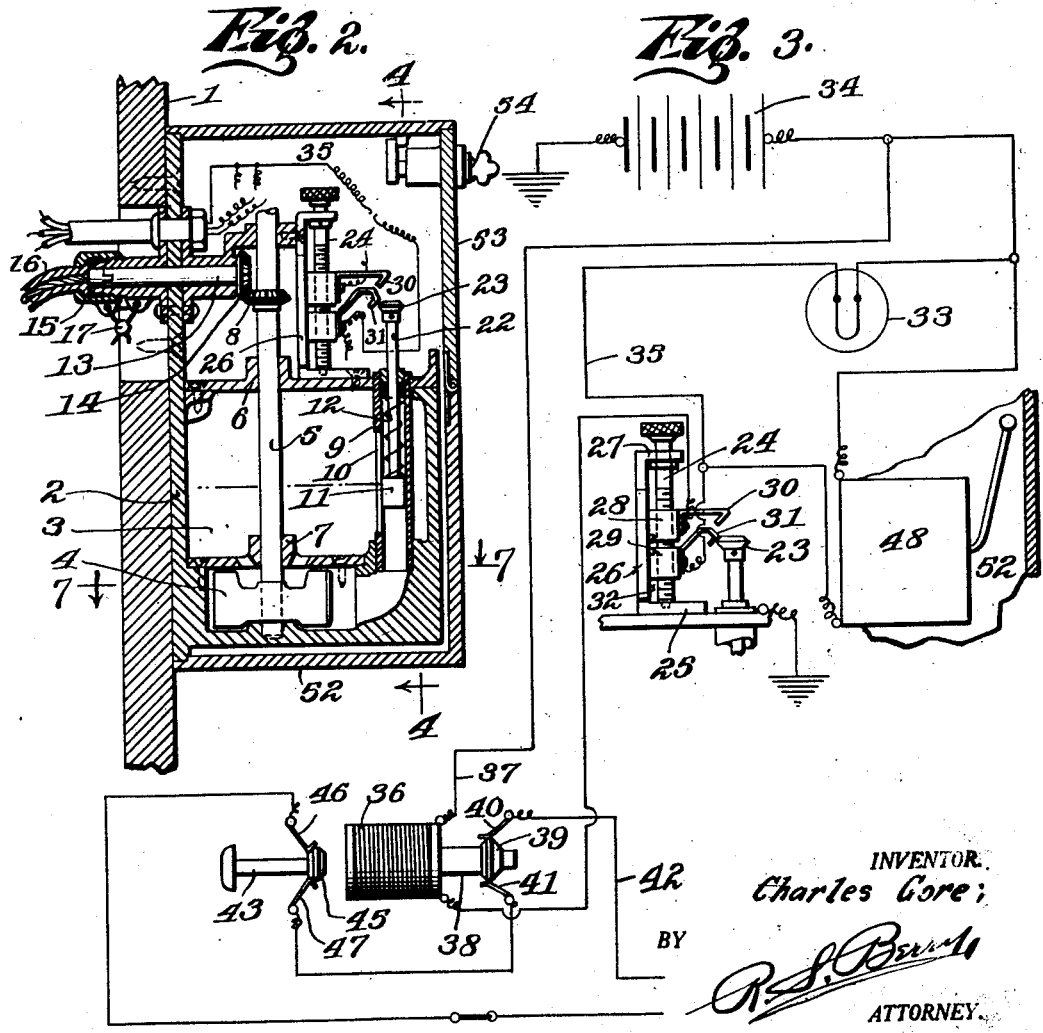
INVENTOR.
Charles Gore;
BY
ATTORNEY.

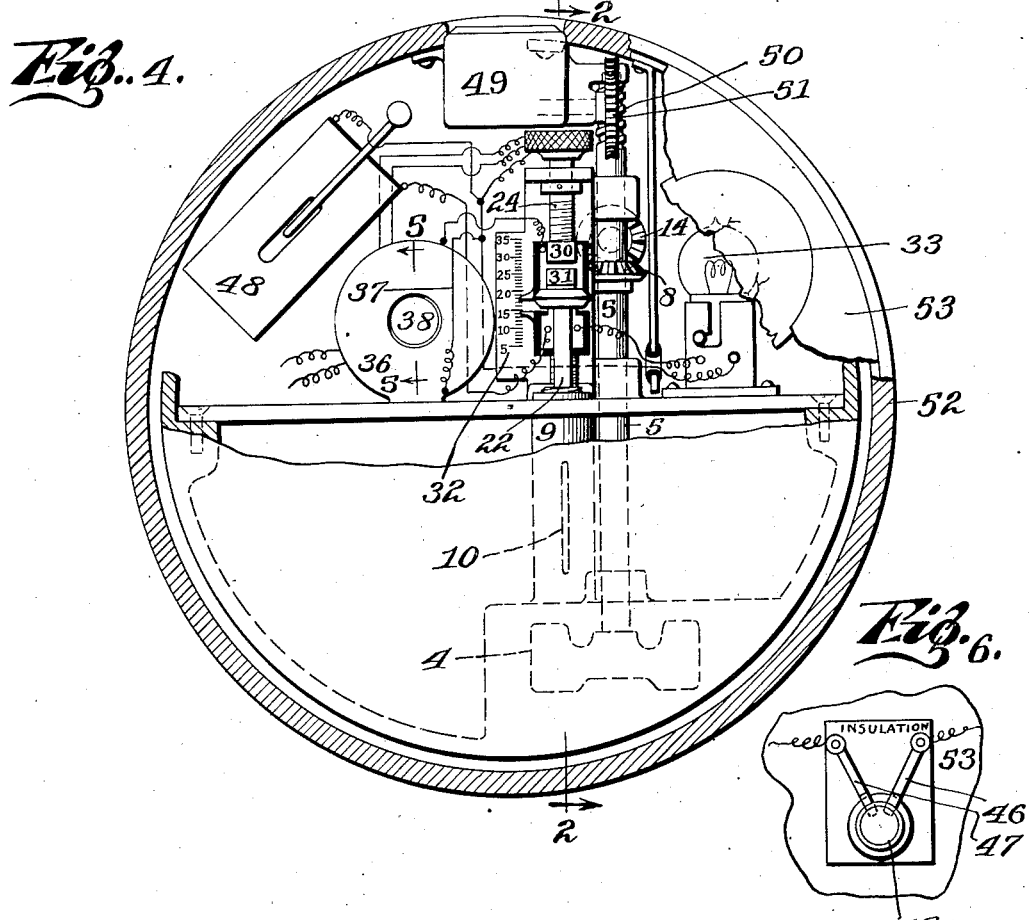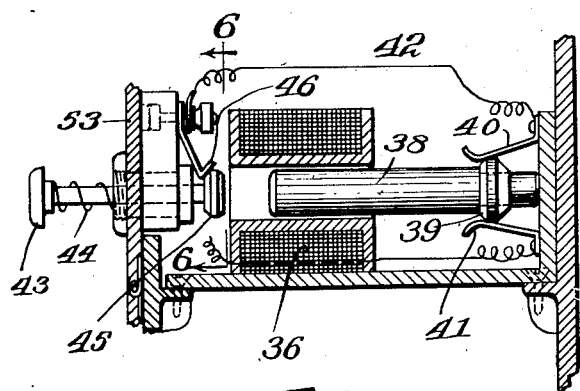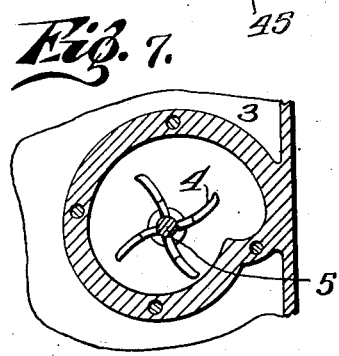

Patented Aug. 21, 1928.

1,681,664

UNITED STATES PATENT OFFICE.

CHARLES GORE, OF LOS ANGELES, CALIFORNIA.

VEHICLE SPEED CONTROL.

Application filed October 18, 1922. Serial No. 595,432.

My invention relates generally to motor vehicles, and more particularly to an ignition control comprising a liquid operated switch provided with a governing mass influenced by the speed of the vehicle.

My invention contemplates placing indicating mechanism upon the instrument board of a motor vehicle, providing mechanism to be connected to a traction wheel and to the indicating mechanism and to the motor circuit, so as to indicate when the vehicle reaches a predetermined speed and so as to break the motor circuit when the vehicle goes above a second predetermined speed.

An object is to fix motor vehicles so they cannot be run above a certain predetermined speed, so as to serve as a check upon reckless operators.

Other objects will appear.

The drawings illustrate the invention.

Figure 1 is a side elevation of a motor vehicle provided with a vehicle speed control in accordance with the principles of my invention, parts being broken away and shown in section.

Fig. 2 is an enlarged sectional elevation, on a plane parallel with Fig. 1, showing the indicating mechanism mounted upon the instrument board and the operating mechanism, the box containing the mechanism being indicated by the arrow 2 in Fig. 1 and the section being on the line 2—2 of Fig. 4.

Fig. 3 is a fragmentary electric diagram of the circuits employed in the speed control.

Fig. 4 is an enlarged sectional and front elevation on the line 4—4 of Fig. 2 looking in the direction of the arrows.

Fig. 5 is a fragmentary sectional detail on the line 5—5 of Fig. 4.

Fig. 6 is a fragmentary view in elevation on the line 6—6 of Fig. 5.

Fig. 7 is a fragmentary sectional detail on the line 7—7 of Fig. 2 and looking downwardly.

Referring to the drawings in detail:

The instrument board 1 may be any suitable support within easy reach and sight of the operator. The mounting plate 2 is rigidly secured against the board 1. A well 3 for a liquid is formed at the side of the lower half of the mounting plate 2, and an impeller wheel 4 operates in the bottom of the well. The wheel 4 is mounted upon a shaft 5 extending through bearings 6 and 7 and having a bevel gear 8 at its upper end. A piston cylinder 9 is mounted vertically in the well 3 with its lower end in position to receive the force of the impeller wheel 4 when the well is filled with proper liquid and the wheel running in the right direction and a discharge slot 10 is formed longitudinally in the cylinder 9. A piston 11 operates in the cylinder 9 and is pressed downwardly by a spring 12 so that when the wheel 4 operates the piston 11 will be raised against the spring 12 and the liquid will flow through the slot 10 back to the well 3. The operation of the piston 11 will vary according to the speed of the wheel 4.

A stub shaft 13 is mounted in bearings through the plate 2 and has a bevel gear 14 meshing with and driving the gear 8. A union nut 15 connects the flexible shaft construction 16 to the shaft 13 and the nut 15 is held against tampering by a seal construction 17. The flexible shaft construction 16 is connected to the gear 18 carried by the traction wheel 19 and meshing with the gear 20 carried by the axle housing or frame, so that as the motor vehicle 21 runs so runs the impeller wheel 4 and so the piston 11 moves up and down. A stem 22 extends from the piston 11 and an electric contact member 23 is carried by the stem. An adjusting screw 24 is conveniently mounted in a frame having a base 25, a back bar 26 and a head 27. Blocks 28 and 29 are seated upon the screw 24 slidingly against the bar 26 so the blocks may be raised or lowered by manipulating the screw 24. Electric contacts 30 and 31 are carried by the blocks 28 and 29 in positions to be successively engaged by the contact 23; the contacts 30 and 31 being disposed in spaced superposed relation with the upper contact 30 projecting a short distance beyond the contact 31 so that as the wiper contact 23 is moved upwardly it will initially touch the contact 31 and on continued upward movement will pass contact 31 and touch contact 30. Graduations 32 are located relative to the contacts 30 and 31 and serve to guide in adjusting the contacts. The blocks 28 and 29 are placed on the screw 24 at any desired distance; the contacts 30 and 31 being maintained in a relative spaced relation after the blocks 28 and 29 have been set on the screw in a desired position. The positions of the contacts 30 and 31 relative to the wiper contact 23 may be adjusted by turning the screw 24, whereupon the blocks 28 and 29 will move collectively to advance the contacts 30 and 31 toward the wiper 23 or retract them relative thereto, as the case might be. As shown, the lower contact 31 is set at fifteen and the upper contact 30 is set at seventeen and one-half. The motor vehicle 21 is supposed to be a truck and the speed control is set so that the truck is not to be driven more than fifteen miles an hour and to stop the engine at seventeen and one-half miles an hour. The indicating mechanism includes a lamp 33 and a battery 34 in the circuit 35 so that when the motor vehicle is going fifteen miles an hour the piston 11 is raised and the contact 23 engages the contact 31 and closes the circuit and turns on the lamp 33 to warn the operator that he is going the speed limit.

The solenoid 36 is conveniently mounted in a circuit 37 leading to the contact 30, so that when the vehicle is going above the speed limit the contact 23 engages the contact 30 and energizes the solenoid. The solenoid core 38 is slidingly mounted and has a conducting head 39 adapted to engage spring terminals 40 and 41 in the spark plug circuit 42, so that when the solenoid 36 is energized the core 38 is pulled away from the terminals 40 and 41 thus breaking the motor circuit 42 and stopping the vehicle. The hand plunger 43 is adapted to push the solenoid core 38 back to its normal position to restore the motor circuit 42 so the vehicle may again be started. A spring 44 holds the plunger 43 in normal position. A conducting head 45 upon the plunger 43 normally engages spring terminals 46 and 47 in the circuit 42 so as to break the circuit when the plunger is being manually operated, so that if the operator attempts to hold the solenoid 38 by pressing the plunger 43 inwardly this act itself will stop the vehicle by breaking the connection between 46 and 47.

A buzzer construction 48 may be incorporated into the indicating mechanism along with the lamp 33. A speedometer construction 49 may be connected to the upper end of the shaft 5, and for this purpose a worm 50 upon the upper end of the shaft 5 meshes with a worm gear 51 which drives the speedometer. A box 52 covers the mechanism and fits the mounting plate 2. A door 53 provides access to the mechanism and is controlled by a lock 54.

Thus I have produced a vehicle speed control which will not allow a vehicle to be operated above a predetermined speed, which when the predetermined speed limit is reached or exceeded will stop the vehicle by breaking the motor circuit, and which may be manually restored to operation. When the device has been set and the box locked the only part accessible to the operator is the plunger 43. If he runs the vehicle too fast and breaks the motor circuit 42 he may restore the circuit by the plunger 43.

The drawings are mainly diagrammatic and suggestive. The well, impeller wheel, piston and so on, constitute a form of governor mechanism responsive to the speed of the vehicle for closing the indicating and controlling circuits.

Various changes may be made without departing from the spirit of my invention as set up in the claims.

I claim:

1. In a device of the character described, a reciprocal stem, a piston on said stem, a tube encircling said piston, an impeller wheel for directing a flow of liquid through said tube to advance said piston and stem, means for retracting said stem, means whereby said impeller wheel may be driven by the propulsion of a vehicle, a wiper contact carried by said stem, a pair of contact members arranged in offset relation in the path of travel of said wiper contact, whereby said wiper contact will engage said contact members successively, and screw means for collectively adjusting said contact members relative to said wiper contact.

2. In a device of the character described, a solenoid, a solenoid core, a switch in an ignition circuit controlled by said core, means controlled by the propulsion of a vehicle for energizing said solenoid, said solenoid adapted when energized to open said switch, a push button adapted to be operated to close said switch, and a second ignition circuit switch controlled by said push button operable on advance of the push button to open the switch, said push button being adapted on being advanced to close the switch controlled by the solenoid.

CHARLES GORE.